United States Patent [19]

Impastato et al.

[11] Patent Number: 5,109,798

[45] Date of Patent: May 5, 1992

[54] FOOD SUPPLEMENT DISPENSING SYSTEM FOR ANIMALS

[76] Inventors: Frank Impastato; Debbie Grass, both of 204A Trefny Ave., Metairie, La. 70003

[21] Appl. No.: 617,135

[22] Filed: Nov. 23, 1990

[51] Int. Cl.⁵ ............................................. A01K 5/00
[52] U.S. Cl. ................................ 119/51.03; 119/157
[58] Field of Search ................. 119/51.01, 51.03, 156, 119/157, 72, 74; 401/220, 219, 218

[56] References Cited

U.S. PATENT DOCUMENTS

| | | | |
|---|---|---|---|
| 483,925 | 10/1892 | Hurdle | 119/51.03 |
| 586,148 | 7/1897 | Tobias | 119/51 |
| 841,283 | 1/1907 | Tjossem | 119/51 |
| 1,080,133 | 12/1913 | Zimmer | 119/51 |
| 1,498,220 | 6/1924 | Winkler | 119/51 |
| 1,569,990 | 1/1926 | Lovering | 119/51.03 |
| 2,158,093 | 5/1939 | Teske | 119/51 |
| 2,158,094 | 5/1939 | Teske | 119/51 |
| 2,293,643 | 8/1942 | Evans | 119/51 |
| 2,807,235 | 9/1957 | Piel | 119/52 |
| 2,972,334 | 2/1961 | Braden | 119/51 |
| 3,069,718 | 12/1962 | Brady et al. | 401/220 |
| 3,075,230 | 1/1963 | Marchant | 401/220 |
| 3,182,347 | 5/1965 | Haines | 401/220 |
| 3,459,159 | 8/1969 | Reed | 119/51 |
| 3,515,098 | 6/1970 | Thurmond | 119/51 |
| 3,589,338 | 6/1971 | Lovitz | 119/51 |
| 3,638,617 | 2/1972 | White | 119/51 |
| 3,734,060 | 5/1973 | Collison | 119/51 R |
| 3,771,496 | 11/1973 | Atchley | 119/72.5 |
| 3,901,191 | 8/1975 | Smith | 119/51 R |
| 3,946,703 | 3/1976 | Wheat | 119/75 |
| 4,386,582 | 6/1983 | Adsit | 119/51 R |
| 4,555,196 | 11/1985 | De Garmo | 401/220 |
| 4,667,430 | 5/1987 | Ziese, Jr. | 43/1 |

FOREIGN PATENT DOCUMENTS

| | | | |
|---|---|---|---|
| 208946 | 6/1908 | Fed. Rep. of Germany | 401/220 |
| 2050458 | 7/1971 | Fed. Rep. of Germany | 401/218 |
| 2218599 | 2/1972 | Fed. Rep. of Germany | 401/218 |
| 2006459 | 4/1978 | Fed. Rep. of Germany | 401/218 |
| 43314 | 10/1926 | Norway | 401/219 |
| 496670 | 12/1938 | United Kingdom | 401/220 |

*Primary Examiner*—Gene Mancene
*Assistant Examiner*—Thomas Price

[57] ABSTRACT

A dispenser system for providing food supplements to deer, cattle and the like. The preferred embodiment of the present invention contemplates an animal activated, liquid supplement container dispenser for dispensing a viscous food supplement such as vitamin or mineral enhanced molasses or the like. The dispenser is configured to be compatible with a large variety of containment systems and stands, and to provide effective, controlled dispensing in the wild with little maintenance. The dispenser including a container with an outlet blocked by a ball valve, which is rotated by a wheel, which in turn is rotated by a wheel under the action of the animal's tongue. As the rotation takes place, the viscous product is dispensed past the ball valve unto the peripheral surfaces of the licking wheel. A first version (FIG. 1) uses a liter bottle container, while second and third versions employ larger reservoirs with multiple dispensers, the second (FIG. 5) being suspended from a tree and the third (FIG. 6) on support legs. The present invention provides an inexpensive, durable system for the dispensing of various nutritional supplements which is compatible with various animal groups and circumstances.

11 Claims, 3 Drawing Sheets

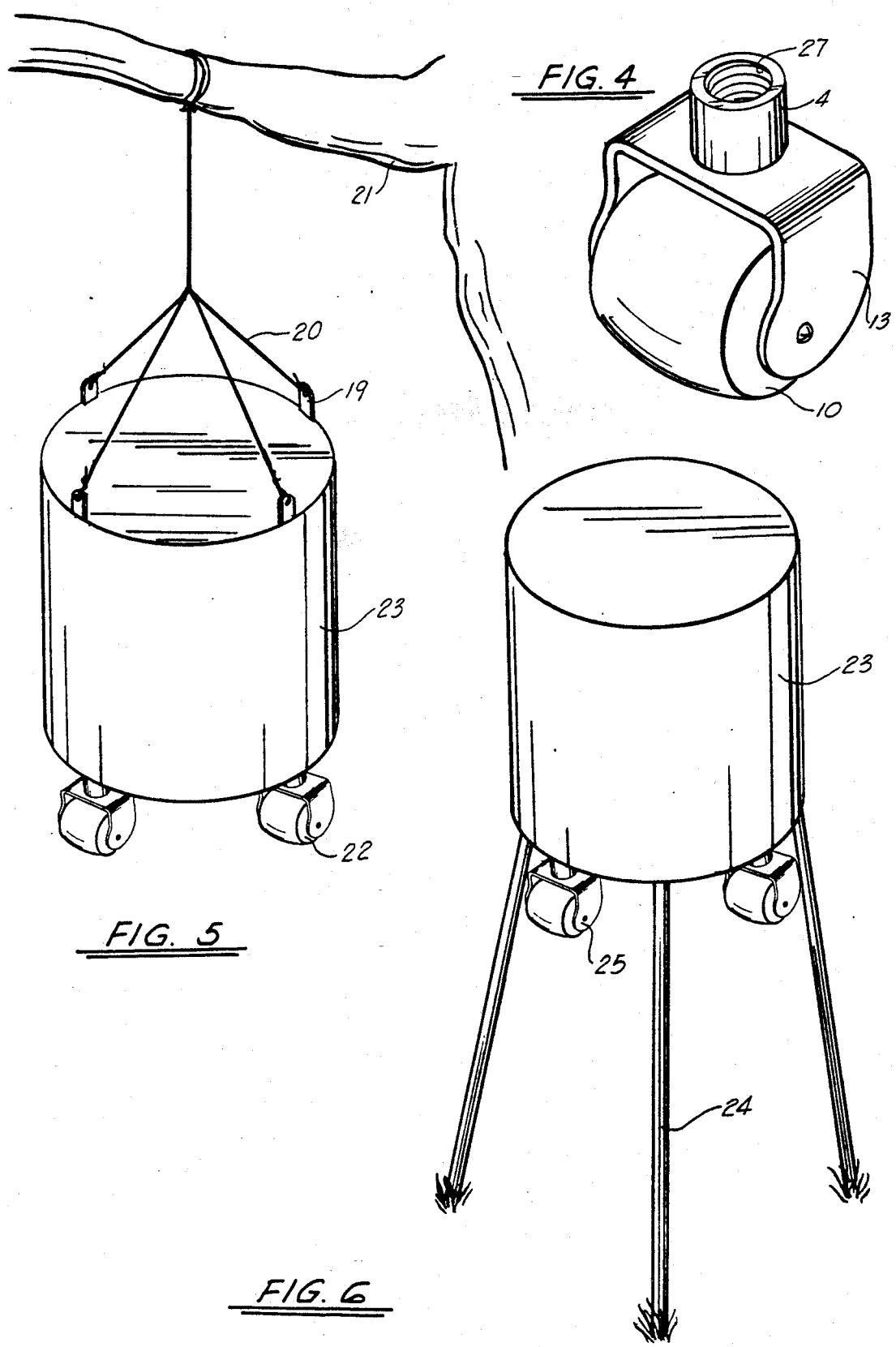

FOOD SUPPLEMENT DISPENSING SYSTEM FOR ANIMALS

BACKGROUND OF INVENTION

1. Field of Invention

The present invention relates to animal feeding devices and more particularly to a dispenser system for providing liquid food supplements to deer, cattle and the like.

The preferred embodiment of the present invention contemplates a user activated, liquid supplement container dispenser for dispensing a viscous food supplement such as vitamin or mineral enhanced molasses or the like.

The dispenser is configured to be compatible with a large variety of containment systems and stands, and to provide effective, controlled dispensing in the wild with little maintenance.

The present invention provides an inexpensive, durable system for the dispensing of various nutritional supplements which is compatible with various animal groups and circumstances.

2. Prior Art & General Background

The prior art has failed to contemplate a portable, maintenance free, effective system for the dispensing of nutritional supplements in the wild or on the farm for various catagories of animals, including deer, cattle, and the like.

A list of prior patents which may be of interest is presented below:

| Patent No. | Patentee(s) | Issue Date |
|---|---|---|
| 483,925 | Hurdle | 10/04/1892 |
| 586,148 | Tobias | 07/13/1897 |
| 841,283 | Tjossem | 01/15/1907 |
| 1,080,133 | Zimmer | 12/02/1913 |
| 1,498,220 | Winkler | 06/17/1924 |
| 1,569,990 | Lovering | 01/19/1926 |
| 2,158,093 | Teske | 05/16/1939 |
| 2,158,094 | Teske | 05/16/1939 |
| 2,293,643 | Evans | 08/18/1942 |
| 2,807,235 | Piel | 09/24/1957 |
| 2,972,334 | Braden | 02/21/1961 |
| 3,459,159 | Reed | 08/05/1969 |
| 3,515,098 | Thurmond | 06/02/1970 |
| 3,589,338 | Lovitz | 06/29/1971 |
| 3,638,617 | White | 02/01/1972 |
| 3,734,060 | Collison | 05/22/1973 |
| 3,771,496 | Atchley | 11/13/1973 |
| 3,901,191 | Smith | 08/26/1975 |
| 3,946,703 | Wheat | 03/30/1976 |
| 4,386,582 | Adsit | 06/07/1983 |
| 4,667,430 | Ziese, Jr. | 05/26/1987 |

As indicated by a review of the above, the prior issued patent pertinent to the present invention may be divided into six subject areas:

1) salt feeders incorporating cylindrical rotating means for dispensing salt as a supplement to livestock and the like;

2) feed boxes incorporating cylindrical, rotating dispensing apparatus for dispensing dry feed;

3) liquid feeders incorporating spherical or cylindrical rotating feeding members wherein the feeding means comprises a ball or the like partially submerged in a trough of feed;

4) miscellaneous deer feeders utilizing various technologies;

5) miscellaneous other feed devices; and 6) water dispensers.

With regard to (1) above, please see U.S. Pat. No. 841,283, 586,148, and 483,925 issued 1907, 1897, and 1892 respectively, teaching similar designs for "salt licks" utilizing cylindrical dispensing means associated therewith.

With regard to (2) above, please see U.S. Pat. No. 1,569,990 teaching a granular feed box dispenser incorporating cylindrical dispensing means somewhat similar to that taught in the above salt dispensers.

With regard to the liquid feeder class, see U.S. Pat. Nos. 3,946,703, 3,901,191, 4,386,582, 4,734,060, 3,459,159, 2,293,643, 2,158,094 and 2,158,093 issued from 1937 to present. Virtually all of the above cited prior art teaches wheels, balls and the like partially submerged in a reservoir of liquid feed below the wheel or ball, therein teaching a different apparatus than that contemplated in the present invention Relative to the miscellaneous deer feeding class, see U.S. Pat. No. 4,667,430 teaching a capillary operating scent dispensing apparatus for luring bucks and the like to an area for hunting purposes.

U.S. Pat. No. 3,638,617 teaches a "deer and wild turkey feeder" wherein the action of the animal eating an ear of corn on the apparatus causes it to dispense an amount of feed.

U.S. Pat. No. 3,515,098 issued 1970 teaches a "wildlife feeder" wherein the animal's action of eating on a piece of brush or the like dispenses feed, as does U.S. Pat. No. 2,972,334, save for a slightly different apparatus design.

With regard to miscellaneous feeders, these encompass 3,840,040, 3,589,338, 2,807,235, 1,492,220 and 1,080,133, contemplating various designs for poultry feeders, Capillary feeders, tube-type water apparatus, etc.

Finally, class (6) encompasses only U.S. Pat. No. 3,771,496 teaching a "demand delivery pump for small animals".

As may be determined by a review of the above, the prior art has failed to contemplate a liquid feeder device as contemplated by the present invention. The prior art liquid feeders, especially liquid supplement dispensers, are shown to be rather bulky, expensive, permanent devices which would be impractical to use in the field. Further, the prior art liquid supplement dispensers appear to be less resistant to rain, dust, and other climate variables when compared to the present device.

Lastly, the prior art has failed to contemplate a device which may be easily reconfigured to have various volume containers and dispensers, as is contemplated by the present device.

3. General, Summary Discussion of the Invention

The present invention overcomes these prior art problems by providing a system which is highly reliable, relatively economical and very cost effective, teaching a food supplement dispenser which is adaptable to a variety of situations and elements, with superior overall performance over the prior art.

The present invention is configured to be effective in the controlled dispensing of viscous food supplements such as enriched molasses or the like to wild or domesticated animals.

The preferred embodiment of the present invention teaches a dispensing device comprising a rotating dispensing surface which is in communication with a gravity ball valve, configured to control the flow of the fluid.

The dispensing surface, in addition to rotating about an axis, also is configured to travel in a linear direction toward the gravity ball valve, pressing the ball valve out of its seat and thereby opening the valve a small amount in order to allow the fluid supplement to be drawn by gravity through the valve opening and onto the dispensing wheel, where it contacts the animal's tongue. It is the animal's "licking action" which rotates and moves the dispenser wheel for dispensing the supplement.

The present invention may be used in a variety of configurations, including portable, single feeder systems utilizing, for example, a one liter soft drink bottle as the reservoir and affixed to a tree, to a multi-feeder system affixed to a 55 gallon drum, with its own stand.

The present system is configured primarily for providing food supplement dispensing means for wild or domesticated deer, in order to help the animal's development of its antlers, growth, and general health. It is believed that such a food supplement system is unique in its apparatus structure and system, which is configured primarily for effective use in the wild.

While it is an object of the present invention to provide a food supplement dispenser for wild or domestic deer, the present system may be utilized for a variety of animals.

It is thus an object of the present invention to provide food supplement dispenser system which may be used for a variety of animals, domestic or wild.

It is another object of the present invention to provide a food supplement dispenser which is adaptable to different size and configuration reservoirs or storage containers and stands.

It is another object of the present invention to provide a food supplement dispenser which provides an effective, controlled means of dispensing a viscous liquid food supplement in a consistent manner.

It is another object of the present invention to provide a food supplement dispenser which may be adjusted for use with various viscosity supplements.

It is another object of the present invention to provide a food supplement dispenser system specifically designed to provide better heath and rack characteristics to the deer population in a particular area.

It is another object of the present invention to provide a food supplement dispenser which is inexpensive to manufacture and easily replaceable.

Lastly, it is an object of the present invention to provide a food supplement dispenser which may be effectively used in a variety of elements without lessening performance.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 4 is an isometric view of animal food supplement dispenser system of FIG. 1.

FIG. 5 is a side, perspective view of an alternative embodiment of the present invention, illustrating the animal food dispenser system of the present invention configured as a multi-dispenser system with a large volume feed reservoir, and hung from a tree.

FIG. 6 is a side, perspective view of the multi-dispenser feeder of FIG. 5, but illustrating an alternative support means, namely, a free standing pole system.

DETAILED DESCRIPTION OF THE PREFERRED EXEMPLARY EMBODIMENT(S)

FIGS. 1-4, the food supplement dispenser

Figure 1:
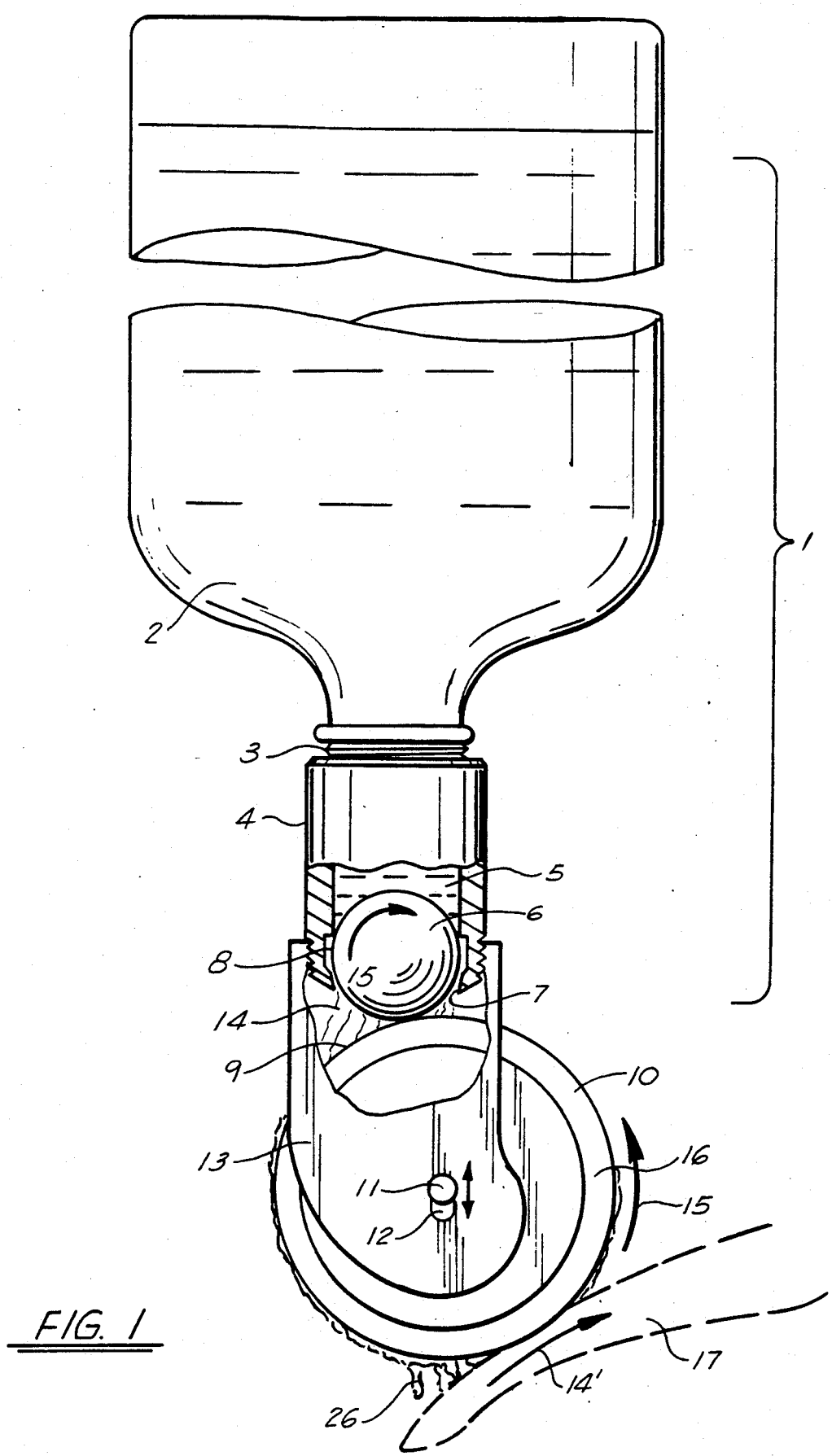
FIG. 1 is a side, partially cutaway, partially cross-sectional view of the preferred embodiment of the animal food supplement dispenser system (with container) of the present invention, illustrating the motion and positioning of an exemplary animal's tongue in phantom line.

As can be seen in FIGS. 1-4, the food supplement dispenser 1 of the preferred, exemplary embodiment of the present invention, comprises a container 2 in the form of, for example, a one liter soft drink bottle which is threadingly engaged 3 to a conduit 4, which is configured to allow the supplement 5 to transfer from the container 2 to the dispenser wheel lo.

The supplement 5 is prevented from leaking from the threaded conduit 4 by dispenser ball bearing 6, which is situated in an open area 8 of conduit 4, resting on tapered seal area 7, which is configured to seal upon contact with bearing 6.

The dispensing wheel 10 is attached on an axle 11, slidingly engaged to bracket 13 having vertical slot 12, which is in turn configured to allow wheel 10 to move in vertical fashion when pressure is applied thereto. This vertical movement presses the contact surface of the wheel against dispenser bearing 6 in an upward fashion, opening the seal between the bearing surface and tapered area 7, and allowing the migration of the supplement 14 to the surface of wheel 9.

Figure 3:
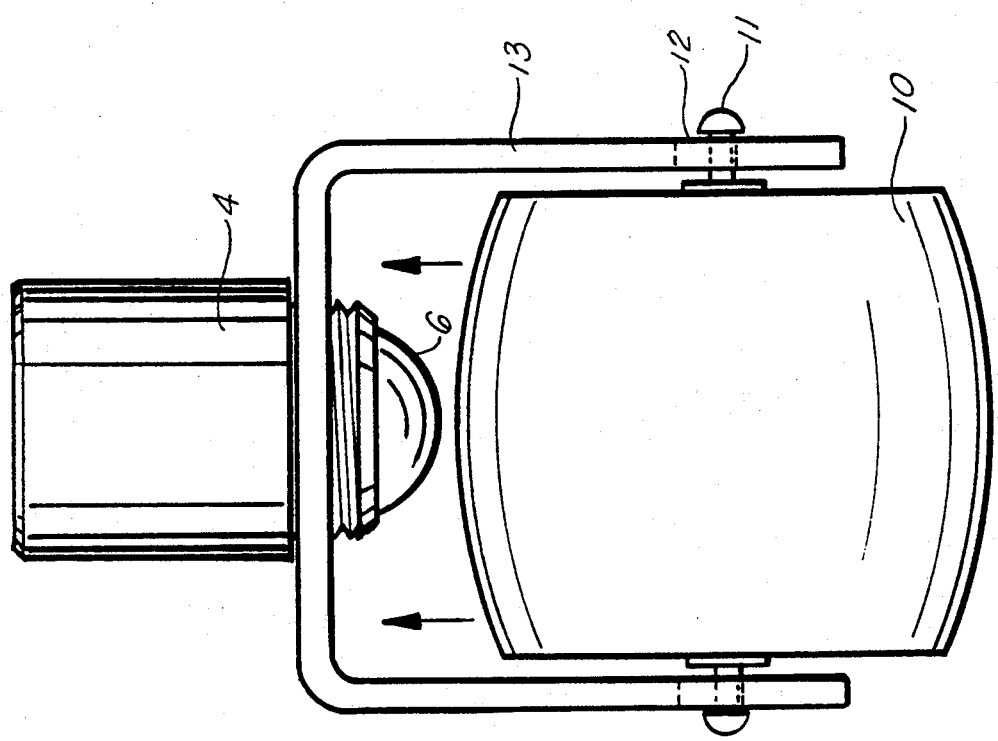
FIG. 3 is an end view of the animal food supplement dispenser system of FIG. 1.
Figure 2:
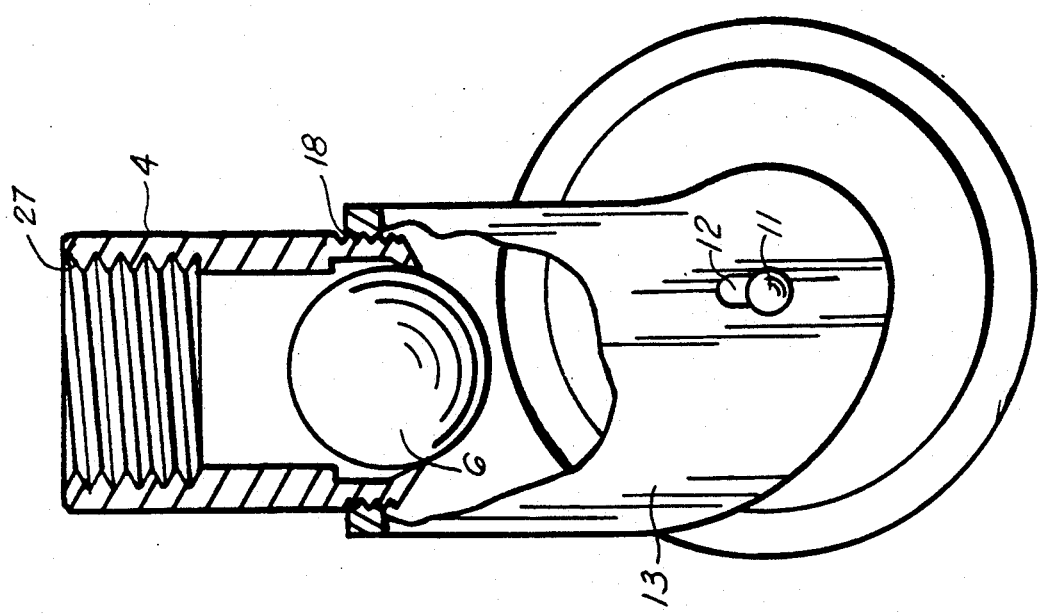
FIG. 2 is a side view of the animal food supplement dispenser system of FIG. 1.

As further shown in FIGS. 2, 3 & 4, the present invention's threaded conduit 4 further includes upper 27 and lower 18 threaded portions for engaging the dispenser and wheel carriage or bracket !3, respectively. FIGS. 2 and 3 further illustrate the vertical travel of wheel 10 via slot 12.

In use, the animal licks the wheel with its tongue 17, causing vertical, lateral and rotatable movement of the wheel, lifting bearing 6 from its contact with tapered seal 7, allowing the supplement to pass through open area 8 and contact the dispensing surface of the wheel 9. The animal's licking action 17' rotates the wheel, allowing the dispensed supplement 26 to reach the tongue 17. Further, the rotating motion 15 of the wheel 10 transfers to ball bearing 6, which in turn is rotated 15', assisting in the dispensing of the usually viscous supplement from the container to the wheel.

While the exemplary embodiment of the present invention teaches upper threaded portion 27 of an exemplary diameter to threadingly engage a one liter soft drink bottle as an inexpensive, effective container for the supplement, other alternative container/dispenser arrangements are readily usable.

For example, FIGS. 5 and 6 illustrate a tree hung unit with multiple dispenser units 22 and a self standing unit with multiple dispenser units 25, respectively. The tree hung unit in FIG. 5 is configured to contain via container 23 substantially more than one liter of feed, and is suspended to, for example, the branch 21 of a tree via cable 20 engaging eyelets 19.

The free standing multi-feeder illustrated in FIG. 6 is similar in operation and configuration to the tree hanging unit of FIG. 5, except it includes means to engage a plurality of le supports 24.

The alternative embodiments of the present invention can include a variety of container sizes from one to fifty-five gallons, and up, depending upon the application.

The embodiments described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

What is claimed is:

1. An animal feeder for dispensing viscous food supplements, comprising:
   a container;
   a dispenser, said dispenser further comprising:
      an engagement portion having a lateral passage therethrough having cylindrical inner side walls and upper and lower ends, said upper end engaged to said container, said engagement portion further comprising:
      a dispenser bearing situated in said lateral passage of said engagement portion, said dispenser bearing configured to communicate with said cylindrical inner side walls in a sliding or rolling fashion;
      a tapered seal situated on said lower end of said engagement portion, said tapered seal configured to seat said dispenser bearing;
      lower engagement means situated at said lower end of said engagement portion;
      a dispenser wheel having an axle and contact surface; and
      bracket means for supporting said axle of said dispenser wheel, said bracket means having first and second side walls, said first and second side walls having a laterally configured slot for receiving said axle, said bracket means being engaged with said lower engagement means of said engagement portion;
      said laterally configured slot configured so as to allow limited movement of said dispenser wheel in a lateral fashion via said axle.

2. The animal feeder of claim 1, wherein said upper end of said engagement means engages with said container via threaded engagement.

3. The animal feeder of claim 2, wherein said bracket further comprises lateral axle support means for supporting said axle of said wheel, said lateral axle support means being configured to allow said axle and said wheel to rotate about said axle support means when lateral force is applied thereto.

4. The animal feeder of claim 3, wherein said dispenser bearing is configured to move in lateral fashion out of said tapered seat and rotate when lateral, rotating force is applied thereto via said contact surface of said wheel.

5. The animal feeder of claim 4, wherein said animal feeder comprises a plurality of dispensers affixed to said container.

6. The animal feeder of claim 5, wherein said container further comprises hanging means for hanging said container from an overhead support.

7. The animal feeder of claim 6, wherein said container further comprises a plurality of upwardly extending support legs.

8. The animal feeder of claim 4, wherein said container comprises a one liter bottle.

9. The animal feeder of claim 4, wherein said food supplement comprises vitamin and mineral enriched molasses.

10. A method of supplying food supplements to animals, comprising the following steps:
    (a) providing a food supplement device, comprising:
       a container having a food supplement therein;
       an engagement portion having a lateral passage therethrough having cylindrical inner side walls and upper and lower ends, said upper end engaged to said container, said engagement portion further comprising:
       a dispenser bearing situated in said lateral passage of said engagement portion, said dispenser bearing configured to communicate with said cylindrical inner side walls in a sliding or rolling fashion;
       a tapered seal situated on said lower end of said engagement portion, said tapered seal configured to seat said dispenser bearing;
       lower engagement means situated at said lower end of said engagement portion;
       a dispenser wheel having an axle and contact surface, said contact surface of said dispenser wheel in lateral communication with said dispenser bearing; and
       bracket means for supporting said axle of said dispenser wheel, said bracket means having first and second side walls, said first and second side walls having a laterally configured slot for receiving said axle, said bracket means being engaged with said lower engagement means of said engagement portion;
       said laterally configured slot configured so as to allow limited movement of said dispenser wheel in a lateral fashion; 'b. dispensing said food supplement by applying upward lateral and rotating force to said dispenser wheel, said dispensing further comprising the following steps:
    i. rotating and migrating said dispenser wheel in an upward, lateral fashion;
    ii. lifting and rotating said dispenser bearing in an upward, lateral fashion, allowing said food supplement to migrate to said dispenser surface of said dispenser wheel; and
    iii. licking said food supplement from said dispenser surface of said dispenser wheel.

11. The method of dispensing a food supplement of claim 10, wherein in step "a" there is included the step of:
    filling said container with a food supplement.

* * * * *